Oct. 23, 1928.
E. RUFFNER
HAND TRUCK
Filed Sept. 26, 1927
1,689,156
3 Sheets-Sheet 2
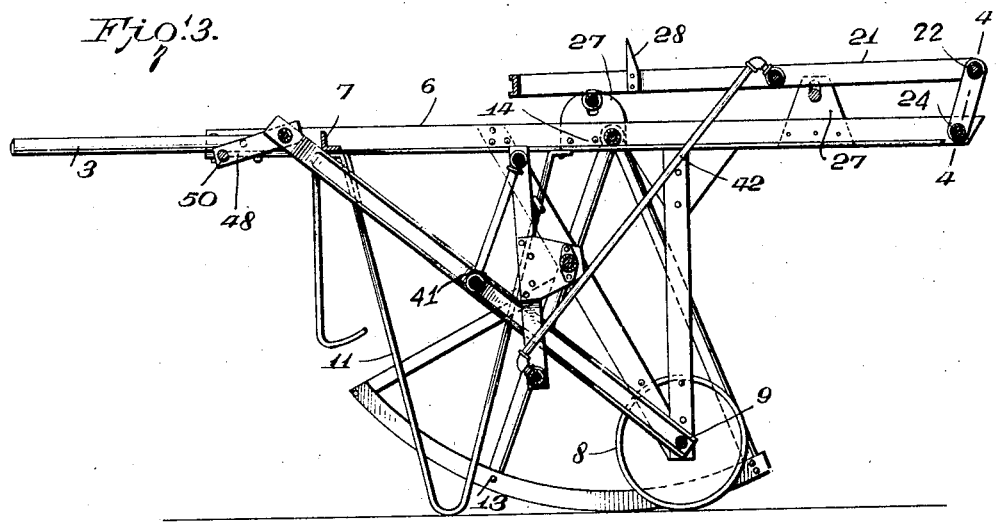
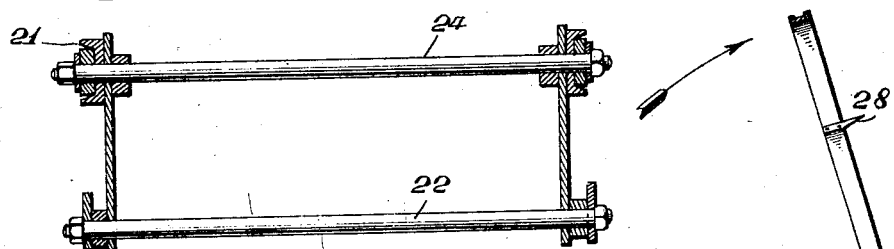
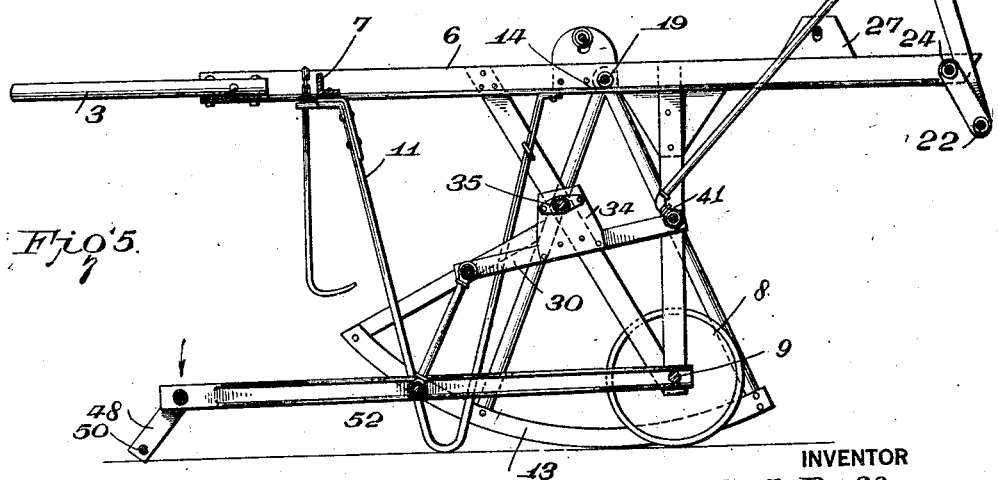
INVENTOR
Earl Ruffner
BY
ATTORNEY

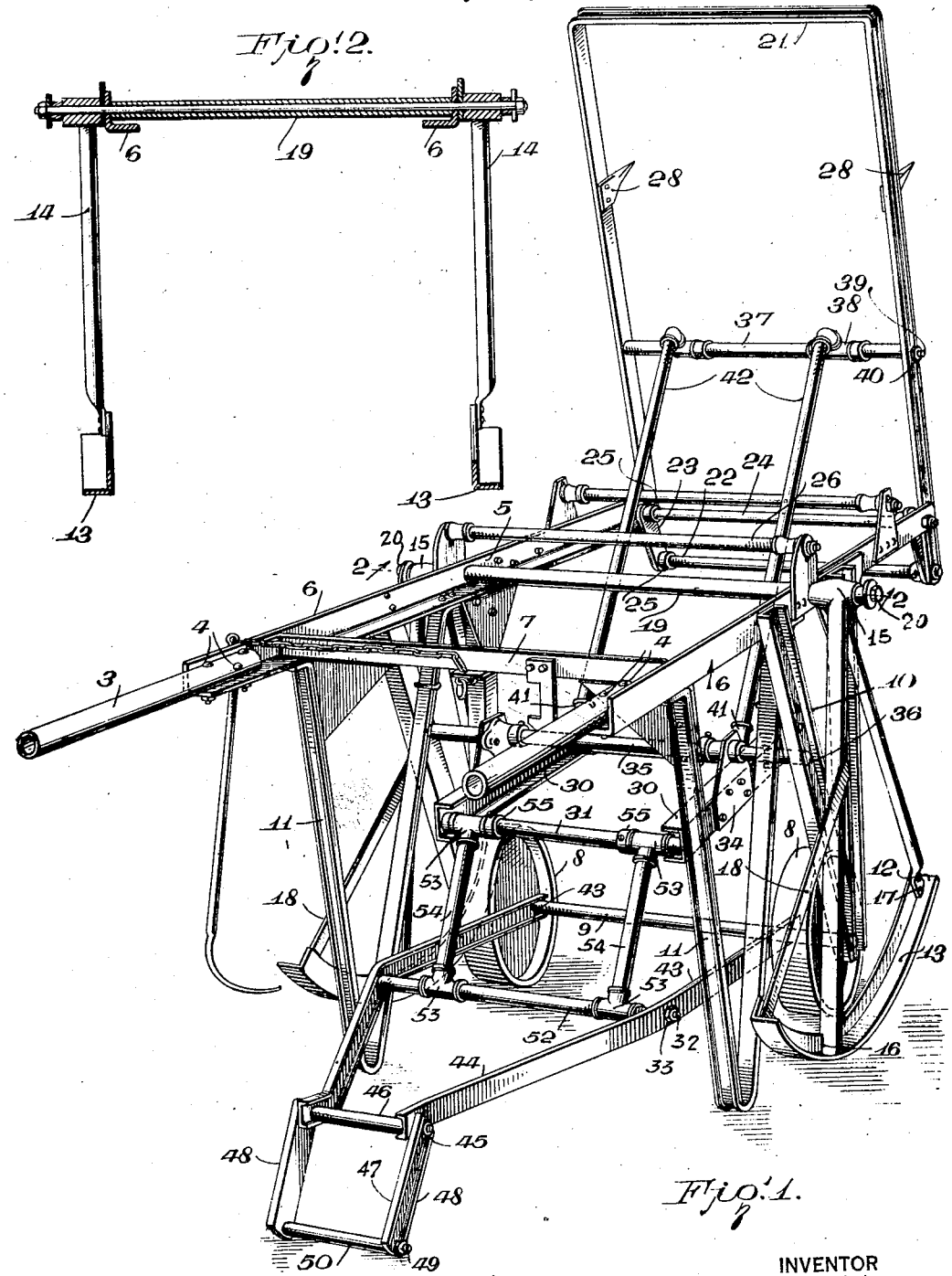

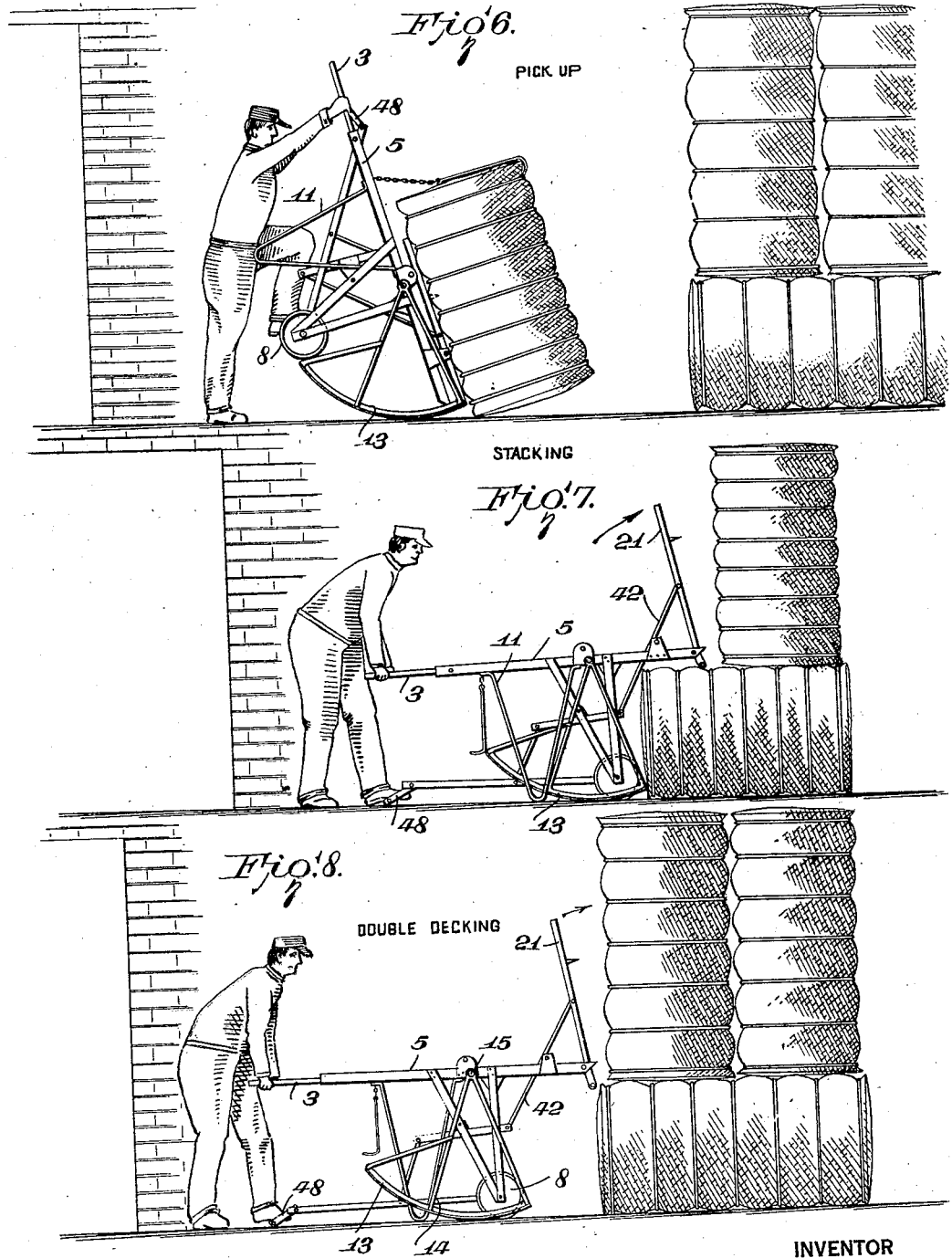

Patented Oct. 23, 1928.

1,689,156

UNITED STATES PATENT OFFICE.

EARL RUFFNER, OF WICHITA FALLS, TEXAS.

HAND TRUCK.

Application filed September 26, 1927. Serial No. 222,054.

My invention relates to hand trucks and more particularly to hand trucks having a tiltable dumping or stacking frame such as disclosed in my co-pending application filed May 13, 1927, Serial Number 191,145.

An object of this invention is to provide a strong and durable hand truck and which is improved generally over the invention disclosed in my co-pending application referred to.

Another object resides in the provision of a hand truck wherein the tiltable lifting or dumping frame is actuated by an improved foot operated mechanism which upon being operated to elevate the frame causes the latter to remain in elevated position until it is lowered by reversely operating the foot operated mechanism.

With the preceding and other objects and advantages in mind the invention consists in the combination of elements, construction, arrangement of parts and operation to be hereinafter specifically referred to, claimed and illustrated in the accompanying drawings, wherein Figure 1 is a perspective of my improved hand truck with the lifting or dumping frame in elevated position;

Figure 2 is a vertical transverse sectional view taken on the line 2—2 of Figure 1;

Figure 3 is a vertical longitudinal sectional view of the invention;

Figure 4 is a vertical section on the line 4—4 of Figure 3;

Figure 5 is a side elevation of the truck with the foot actuated mechanism in depressed position and the lifting or dumping frame elevated, parts of the latter being shown in section;

Figure 6 is an elevation illustrating the manner in which the truck is manipulated to pick up a bale or other object; and Figures 7 and 8 are elevations of the truck as employed for stacking or double-decking operations.

Referring to the invention a horizontal supporting frame 5 is provided made up of longitudinally extending angle irons 6 connected adjacent their rear ends by a transverse angle iron 7.

To control the truck tubular handles 3 extend longitudinally from the rear ends of the angle bars 6 and are attached thereto by suitable fastenings 4. Ground engaging wheels 8 are provided which are journalled on a shaft 9 extending transversely beneath the frame and engaged in V-shaped bearings or brackets 10 depending from the angle irons 6 intermediate their ends in transverse alignment. These bearings or brackets are fashioned from pairs of angle irons arranged with their lower ends in overlapping relation. To normally support the frame in horizontal position when the truck is stationary, V-shaped legs 11 formed of angle iron are attached to the under faces of the angle irons 6 rearwardly of the wheels 8.

The invention provides means whereby the truck may be bodily tilted to a substantially vertical position to facilitate the picking up of a bale or other load, consisting of a pair of transversely aligned rockers 13 disposed upon opposite sides of the frame 5 and in transverse alignment with the wheels. Each of the rockers consists of a longitudinal bowed rocker element 13 from which an inverted V-shaped swinging bracket 14 extends, the latter having a sleeve or bearing 15 formed at its upper end. As illustrated in Figure 1 the swinging brackets are formed from lengths of tubing and are arranged with one leg of each bracket resting upon and secured to the rocker elements intermediate their ends by welding, as at 16, while the lower ends of the other legs are flattened as at 17, and riveted to the extreme ends of the rocker elements. A brace 18 extends from the rear end of each rocker to the adjacent leg of its swinging bracket. To mount the rockers on the frame a fixed shaft 19 extends transversely of the frame through its angle bars 6 at their center and receives the sleeves or bearings 15 thereon. Nuts 20 are threaded upon the ends of the shaft to retain the sleeves or bearings in place.

A tiltable load lifting frame 21 formed of channel iron is provided. This frame 21 is U-shaped and its extremities are pivotally mounted upon a laterally movable shaft 22 extending transversely across the forward end of the frame, the shaft being supported loosely by arms 23 pivoted upon the ends of a transverse horizontal rod 24 carried by the forward ends of the angle bar 6. Collars 25 are provided on the shaft 22 and rod 24 respectively to retain the arms against lateral movement.

Normally the tiltable frame 21 is disposed in a horizontal position on the frame 5 and in spaced relation thereto. For this purpose a pair of cross bars 26 extend transversely across the angle bars 6 and are supported above these angle bars by pairs of transversely aligned upstanding plates 27 attached to the angle bars.

Upstanding barbs 28 are carried by the frame 21 in transverse alignment adjacent its free end and are adapted to penetrate the bale or other package to prevent it from shifting longitudinally of this frame. Foot actuated operating mechanism is provided for elevating and lowering the frame 21 which consists of a pair of short channel members 30 arranged below the frame 5 and connected at their ends by lengths of tubing 31 which are loosely supported on tie rods 32 passing through the ends of the channel members and receiving nuts 33.

Vertically extending bearing plates 34 are carried by the channel members at their centers and are pivotally supported on a fixed horizontally disposed shaft 35, the latter being disposed transversely of the frame and vertically adjustable in series of vertically aligned openings 36 in the channel members 10.

A short length of pipe 37 provided with a pair of pipe unions 38 extends transversely of the tiltable frame 21 intermediate its ends and attached thereto by tie rod 39 with which nuts 40 are engaged. Couplings 41 identical to the couplings 38 are fixed to the tubular member 31 carried at the forward ends of the channel members 30 and connecting these couplings is a pair of parallel tubular arms 42.

An actuating lever made up of channel shaped members 43 is pivotally mounted upon the shaft 9 inwardly with respect to the ground engaging wheels 8. These channel shaped members are disposed in parallelism for approximately one-half their length, but for the remainder of their lengths converge as at 44 and are connected together by a tie rod 45 passing through a short length of tubing 46 interposed between and spacing the rear ends of the levers 43.

A foot engaging yoke 47 is carried by the rear ends of the levers and is made up of channel members 48 pivoted upon the tie rod 45 and connected at their opposite ends by a tie rod 49 receiving a tubular foot engaging member 50.

Interposed between the channel shaped members 43 intermediate their ends and mounted on a tie rod 51 connecting these channel shaped members is a tubular member 52. Pivotally mounted on the tubular members 31 and 52 are pairs of T fittings 53 and connected with these pairs of fittings are tubular arms 54. Collars 55 are held on the tubular member 31 at the inner ends of the fittings 53 thereon to retain the fittings and tubular arms against lateral shifting.

With the tiltable frame resting on the supporting rods 25 the levers 43 assume an oblique angular position with respect to the vertical with the foot engaging yoke disposed at the level of the frame 5 at the rear end thereof and the channel members 30 disposed in a vertical position.

To actuate the tiltable frame 21 to elevated position to throw the load forwardly from the truck as indicated in Figures 7 and 8, the lever 43 is depressed by the operator's foot engaged with yoke 47 to swing the channel members on the axis 35 to the position illustrated in Figure 5, which shifts the arms 42 longitudinally thereby tilting the frame 21 on its axis. Reversely, to lower the tiltable frame the lever 43 is swung upwardly to the position indicated in Figure 3.

What I claim is:

1. In a hand truck a wheeled frame, a load ejecting frame pivotally attached thereto and normally disposed horizontally thereon, a lever pivotally mounted beneath the frame intermediate its ends to swing about a horizontal axis, an operating lever operatively connected with one end of the first mentioned lever and an operative connection between the opposite end of the first mentioned lever and the load ejecting frame whereby to elevate the load ejecting frame upon movement of the operating lever in one direction, the operating lever being normally retained in an out-of-the-way position incident to the normal position of the ejecting frame.

2. In a hand truck a wheeled frame, a normally horizontal load ejecting frame pivotally connected therewith, a pair of longitudinal members connected together at their ends and pivotally supported intermediate their ends to swing about a horizontal axis, a plurality of parallel arms operatively connected with the longitudinal members at one end thereof and having their opposite ends connected with the load ejecting frame, a normally angularly disposed operating lever pivotally supported beneath the wheeled frame and having operative connection with the opposite ends of the longitudinal members whereby upon rocking of the operating lever in one direction, the longitudinal members will be rocked and the load ejecting frame tilted to a substantially upright position.

3. In a hand truck a wheeled frame, a load ejecting frame pivotally attached thereto and normally disposed in a horizontal position thereon, a swinging member supported beneath the wheeled frame and normally disposed in a substantially vertical position, an operating lever pivotally mounted beneath the wheeled frame, an operative connection between the opposite ends of the swinging member, load ejecting frame and operating lever whereby the latter is normally retained away from the ground incident to the horizontal position of the load ejecting frame, the operating lever being movable towards the ground to swing the swinging member in a direction to lift the load ejecting frame to a substantially vertical position.

4. In a hand truck a wheeled frame, a load ejecting frame pivotally attached thereto and normally disposed in a horizontal position thereon, a swinging member supported beneath the wheeled frame and normally disposed in a substantially vertical position, an operating lever pivotally mounted beneath the wheeled frame, an operative connection between the opposite ends of the swinging member, load ejecting frame and operating lever whereby the latter is normally retained away from the ground incident to the horizontal position of the load ejecting frame, the operating lever being movable towards the ground to swing the swinging member in a direction to lift the load ejecting frame to a substantially vertical position, and rockers depending from the wheeled frame whereby the latter may be disposed in a vertical position for loading.

5. In combination a horizontally disposed wheeled frame, a load ejecting frame pivotally connected therewith, a normally substantially vertically disposed swinging member supported beneath the frame, longitudinally shiftable rods operatively connected with the swinging member and load ejecting frame, an operating lever pivotally connected with the wheeled frame, and an operative connection between the operating lever and opposite end of the swinging member whereby to raise and lower the load ejecting frame upon manipulation of the operating lever.

6. In combination a wheeled frame, a load ejecting frame pivotally connected therewith and normally disposed in a horizontal position thereon, means for raising and lowering the load ejecting frame including a pair of connected longitudinal members having their forward ends pivotally supported beneath the wheeled frame, a foot engaging element carried by the free ends of the longitudinal members, a swinging member beneath the wheeled frame, and operative connection between one end of the swinging member and the longitudinal members and the opposite ends of the swinging member and load ejecting frame whereby to raise and lower the latter incident to the raising and lowering of the connected longitudinal members.

EARL RUFFNER.